A. G. M. MICHELL
Nov. 25, 1930. Re. 17,879
CONSTRUCTION OF OPERATING CRANKLESS INTERNAL COMBUSTION AND EXPLOSION ENGINES
Original Filed July 1, 1927
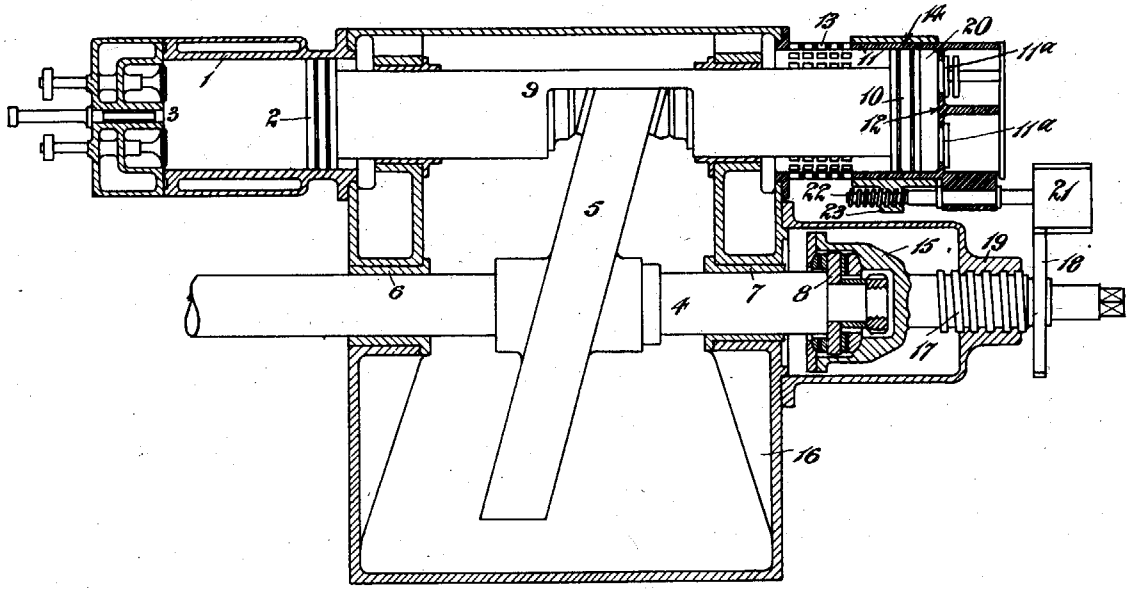
Inventor,
Anthony G. M. Michell,
By Lenny & Hoffman Jr.
Atty.

Reissued Nov. 25, 1930

Re. 17,879

UNITED STATES PATENT OFFICE

ANTHONY GEORGE MALDON MICHELL, OF MELBOURNE, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK

CONSTRUCTION OF OPERATING CRANKLESS INTERNAL COMBUSTION AND EXPLOSION ENGINES

Original No. 1,698,102, dated January 8, 1929, Serial No. 202,897, filed July 1, 1927, and in Great Britain July 27, 1926. Application for reissue filed September 16, 1930. Serial No. 482,346.

This invention relates to improvements in the construction, arrangement and in the mode of operating reciprocating engines of the type in which the pistons reciprocate along lines parallel to the axis of the shaft of the engine, such engines being designated herein, for the sake of brevity, crankless engines.

The object of the invention is to produce an engine of that type which shall have greater flexibility and which shall admit of more convenient and efficient methods of control than existing internal combustion or explosion engines.

By the expression "greater flexibility" is meant that the engine is capable of operating at any given speed, with a greater range of turning moment and consequently of power, without limitations due to defective ignition or combustion of the fuel.

It is a well-known defect of existing internal combustion and explosion engines, that the range of turning moment which they are capable of exerting at given speed is comparatively small. For this reason it is usual to combine with such engines a variable transmission gear, which enables the turning moment applied to the driven shaft to be increased or diminished independently of that exerted by the engine.

It is one of the aims of the present invention to dispense, either completely or partially, with such transmission gear. In particular, the improvements in construction and operation are intended to be applied to internal combustion and explosion engines of the crankless type for the propulsion of land vehicles, including railway locomotives, with the object of conferring on such engines the characteristic of flexibility which enables steam engines to be used for such purposes without the addition of change-speed mechanical gearing or other variable transmission apparatus.

The accompanying drawing is a longitudinal sectional view through a multi-cylinder engine to illustrate one of the cylinder units incorporating a practical example of the invention.

For the purpose of illustration the invention is shown in application to a crankless engine of the kind described in the specification of United States Patent No. 1,409,057, Reissue No. 15,756. For the description of the mechanism of this engine, and for definition of the terms hereinafter used in describing that mechanism, reference is directed to the above cited specification.

The engine is constructed with one or more internal combustion cylinders 1 which operate on one or other of the well-known internal combustion or explosion cycles, either four-stroke or two-stroke. Where a plurality of cylinders are arranged about the main shaft the construction may accord with that described in the above cited patent. As in all such engines, the essential operations are that the working fluid is compressed during the upward stroke of the piston 2 with a rise of pressure depending on the ratio of the clearance volume 3 to the volume swept by the piston. The fuel is either introduced before compression or is injected after compression and ignited either by the heat generated by the compression of the air or by electric spark or other suitable means. The maximum amount of power which can be developed at each stroke of the engine depends on the quantity of fuel which can be burned in the cylinder, and this again depends directly on the mass of air available for its combustion, that is on the mass of air in the clearance volume 3 at the end of the compression stroke. Since the compression pressure is limited by practical considerations, this mass is in practice approximately proportional to the volume of the compression space.

In internal combustion and explosion engines as usually constructed the volume of the compression space is fixed. Constructions are, however, already known, in which the compression volume is variable. The present invention consists of means producing such variation in a crankless engine, and also includes means for varying the air supply to the said compression space.

The main shaft 4 of the engine on which is mounted the slant 5 is carried in journal bearings 6, 7 and its longitudinal position is determined by the thrust bearing 8. The engine piston 2, is rigidly connected through the yoke 9 to a piston 10, the two pistons thus reciprocating together as the slant 5 revolves. The piston 10 reciprocating in the cylinder 11 serves to supply air for the combustion in the power cylinder through connecting passages or pipes not shown in the drawing. Valves 11[a] are provided in the cylinder head 12 for admitting air into the cylinder 11 from the atmosphere and for controlling delivery of air compressed in that cylinder to the power cylinder 1. These valves may be either automatically or mechanically operated. A portion 13 of the cylinder wall at the end remote from the head 12 of the cylinder 11, is perforated but is constructed so as to be capable of being closed and rendered effective as a cylinder wall by the movable sleeve 14. In the drawing, the position of the sleeve 14 is such as to give the maximum degree of opening to the perforations, and as the piston 10 overruns these perforations in its working stroke only the portion of the cylinder, between the cylinder head and the perforations nearest thereto is available for delivering air to the power cylinder 1. By moving the sleeve 14 towards the left, a larger and larger portion of the cylinder becomes so available, and a larger and larger quantity of air is compressed at each working stroke into the power cylinder 1.

As already stated, the pressure to which such air can be compressed is limited by practical consideration. In order that the power cylinder 1 may receive the larger quantities of air without exceeding the permissible pressure, means are provided for increasing the effective volume of the compression space when required. For this purpose the thrust bearing 8 is mounted in a movable housing 15, which is made capable of being moved longitudinally with respect to the frame 16 of the engine, and to the cylinder 1 which is fixed to the said frame. For this purpose the housing 15 may be furnished with a screw 17 which is provided with means, such as a gear wheel 18, for rotating it in the nut 19 attached to the engine frame. Rotation of the gear wheel 18, which may be effected by hand, or by gearing from the engine itself, or by an independent motor, thus moves longitudinally the engine shaft, slant 5 and pistons 2 and 10. If the motion is towards the right the compression space 3 in the cylinder 1 is increased, while the compression space 20 in the head of the cylinder 11 and the extent to which the piston 10 overruns the perforated portion 13 of the cylinder 11 are both diminished. Thus simultaneously the cylinder 1 is adapted to receive more air, and the cylinder 11 to supply an increased quantity. The latter effect is enhanced if at the same time the sleeve 14 is moved longitudinally to the left over the perforated portion 13 of the cylinder 11, and for this purpose the gear wheel 18 may be arranged to engage with a gear wheel 21 mounted on a screw 22 engaging in nut 23 attached to the sleeve 14. Alternatively, the sleeve 14 may be actuated by means independent of the means employed for moving the thrust bearing 8.

In addition to the variation of the quantity of air admitted to the power cylinder 1 by the means above described, the quantity of fuel supplied to the cylinder may also be varied, as by varying the stroke of the fuel pump, or by opening or closing a bypass valve on the fuel-supply pipe, or by other known means. Such mechanism controlling the fuel supply, may be automatically coupled to the mechanism for varying the air supply, so that the quantities of air and fuel increase or diminish together. But, in order to give a wider range of variation of power of the engine, the diminution of the fuel supply may be continued, after the air supply has been reduced to the limit which the means of its control permits and down to the point at which the proportion of fuel to air is so low that efficient combustion no longer takes place. When more than one of the intake cylinders 11 are used, they may be arranged to deliver separately into corresponding power cylinders 1, or may deliver into a common reservoir from which each of the power cylinders is supplied in turn.

It is to be understood that in place of the sleeve 14 operating in connection with the perforated cylinder wall 13, other means may be employed for varying the effective volume of the cylinder 11, and in certain cases such means may be omitted altogether if sufficient variation of the quantity of combustion air is provided by the variation of the limits of the the stroke of the piston 10 consequent on the movement of the thrust bearing 8. It is also to be understood that the thrust bearing 8, may be applied directly to the slant 5 instead of to a collar on the shaft 4 and that the slant 5 may be arranged to slide longitudinally on the shaft instead of being rigidly mounted thereon, and that various means other than a screw, may be employed for moving the slant longitudinally. Thus it may be moved by the plunger of a small hydraulic press supplied with oil under pressure from a pump driven by the engine. The movement of the thrust bearing whether by a screw or other means may be controlled directly by the driver or may be effected automatically according to the speed or load of the engine through a centrifugal governor or like contrivance.

What I claim is:

1. In an internal combustion engine, in combination, a combustion cylinder, a swash plate having a fixed inclination and its axis of rotation parallel to the axis of the combustion cylinder, a piston fitting said combustion cylinder and arranged to coact with and rotate said swash plate, and means for moving said swash plate and coacting piston in the direction of their axes, whereby the compression volume of the said cylinder is increased or diminished at will while the stroke of the piston remains constant.

2. In an internal combustion engine, in combination, a combustion cylinder, a swash plate having a fixed inclination and its axis of rotation parallel to the axis of the combustion cylinder, a piston fitting said combustion cylinder and arranged to coact with and rotate said swash plate, a compressor supplying working fluid to the combustion cylinder, and means for moving said swash plate and coacting piston in the direction of their axes and simultaneously varying the capacity of said compressor whereby the quantity of working fluid supplied to the combustion cylinder is varied simultaneously with the compression volume therein, for the purposes set forth.

3. In an internal combustion engine, in combination, a combustion cylinder, a swash plate having a fixed inclination and its axis of rotation parallel to the axis of the combustion cylinder, a power piston fitting said combustion cylinder and arranged to coact with and rotate said swash plate, a compressor piston connected to said power piston and fitting in a compressor cylinder for supplying working fluid to the combustion cylinder, and means for moving the said swash plate and therewith the coacting power piston and compressor piston in the direction of the axes of their cylinders, whereby the quantity of working fluid supplied to the combustion cylinder is varied simultaneously with the compressor volume therein, for the purpose set forth.

4. In an internal combustion engine, a combustion cylinder, a swash plate having its axis of rotation parallel to the axis of the combustion cylinder, a power piston in the latter and arranged to coact with and rotate said swash plate, a compressor cylinder for supplying working fluid to the combustion cylinder having perforations in the wall thereof, a compressor piston in the compression cylinder overrunning said perforations to a variable extent according to the movement of the compresor piston and swash plate, and means for moving the swash plate and pistons in the direction of the axes of said cylinders, whereby the quantity of working fluid supplied to the combustion cylinder is varied simultaneously with the compressor volume therein.

5. In an internal combustion engine, a combustion cylinder, a swash plate having its axis of rotation parallel to the axis of the combustion cylinder, a power piston in the latter and arranged to coact with and rotate said swash plate, a compressor cylinder for supplying working fluid to the combustion cylinder having perforations in the wall thereof, a compressor piston in the compression cylinder overrunning said perforations to a variable extent according to the movement of the compressor piston and swash plate, means for moving the swash plate and pistons in the direction of the axis of said cylinders, and a sleeve concentric with the compression cylinder movable simultaneously with the swash plate to cover said perforations to a variable extent.

6. In an internal combustion engine, a combustion cylinder, a swash plate having its axis of rotation parallel to the axis of the combustion cylinder, a power piston in the latter and arranged to coact with and rotate said swash plate, a compressor cylinder for supplying working fluid to the combustion cylinder having perforations in the wall thereof, a compressor piston in the compression cylinder overrunning said perforations to a variable extent according to the movement of the compressor piston and swash plate, means for moving the swash plate and pistons in the direction of the axis of said cylinders, a sleeve concentric with the compression cylinder movable simultaneously with the swash plate to cover said perforations to a variable extent, a thrust bearing for the swash plate, and means for simultaneously moving the sleeve and thrust bearing axially.

7. In an internal combustion engine, a combustion cylinder, a swash plate having its axis of rotation parallel to the axis of the combustion cylinder, a power piston in the latter and arranged to coact with and rotate said swash plate, a compressor cylinder for supplying working fluid to the combustion cylinder having perforations in the wall thereof, a compressor piston in the compression cylinder overrunning said perforations to a variable extent according to the movement of the compressor piston and swash plate, means for moving the swash plate and pistons in the direction of the axes of said cylinders, a sleeve concentric with the compression cylinder movable simultaneously with the swash plate to cover said perforations to a variable extent, a shaft on which the swash plate is mounted in fixed relation thereto, a thrust bearing on said shaft, and means for moving the sleeve, thrust bearing and shaft longitudinally.

8. In an internal combustion engine, in combination, a swash plate rigidly mounted on a rotating shaft and movable longitudinally therewith, a plurality of combustion cylinders surrounding the axis of the shaft and having their axes parallel thereto, a plurality of compressor cylinders each opposed to and coaxial with one of combustion cylinders, a power piston in each combustion cylinder and a compressor piston in each compression cylinder rigidly connected together as a reciprocating unit coacting with the rotating swash plate, perforations in the wall of each of said compressor cylinders adapted to be uncovered to a greater or lesser extent by the compressor piston at the outer end of its stroke, a sleeve surrounding each of the compressor cylinders and capable of axial movement with respect thereto, a thrust bearing of which the rotating element is rigidly mounted upon the shaft and the stationary element is mounted in a housing capable of axial movement with respect to the cylinders, and means for moving the thrust bearing, shaft and swash plate, reciprocating units and sleeves in the direction of their axes for the purposes set forth.

9. In an internal combustion engine, in combination, a combustion cylinder, a swash plate having its axis of rotation parallel to the axis of the combustion cylinder, a piston fiting said combustion cylinder and arranged to coact with and rotate said swash plate, a compressor supplying working fluid to the combustion cylinder, and means for simultaneously varying the capacity of the compressor and the compression volume in the combustion cylinder.

10. In an internal combustion engine, in combination, a combustion cylinder, a swash plate having its axis of rotation parallel to the axis of the combustion cylinder, a piston fitting said combustion cylinder and arranged to coact with and rotate said swash plate, a compressor supplying working fluid to the combustion cylinder, and means for simultaneously increasing the compression space in the combustion cylinder and the capacity of the compressor.

11. In an internal combustion engine, in combination a combustion cylinder, a swash plate having its axis of rotation parallel to the axis of the combustion cylinder, a piston fitting said combustion cylinder and arranged to coact with and rotate said swash plate, a compressor supplying working fluid to the combustion cylinder, and means for simultaneously increasing the compression space in the combustion cylinder and the capacity of the compressor and for simultaneously decreasing the compression space in the combustion cylinder and the capacity of the compressor.

12. In an internal combustion engine, in combination, a combustion cylinder, a swash plate having its axis of rotation parallel to the axis of the combustion cylinder, a power piston fitting said combustion cylinder and arranged to coact with and rotate said swash plate, a compressor piston connected to said power piston and fitting in a compressor cylinder for supplying working fluid to the combustion cylinder, and means for simultaneously varying the capacity of the compressor and the compression volume in the combustion cylinder.

13. In an internal combustion engine, in combination, a combustion cylinder, a swash plate having its axis of rotation parallel to the axis of the combustion cylinder, a power piston fitting said combustion cylinder and arranged to coact with and rotate said swash plate, a compressor piston connected to said power piston and fitting in a compressor cylinder for supplying working fluid to the combustion cylinder, and means for simultaneously increasing the compression space in the combustion cylinder and the capacity of the compressor.

14. In an internal combustion engine, a power cylinder, a piston therein, a shaft, operative driving means between said piston and said shaft, a compressor cylinder, a piston therein driven by power derived from the piston in the power cylinder, and means for simultaneously varying the volume of the compression space in the power cylinder and the capacity of the compressor cylinder, while maintaining the strokes of said pistons constant.

15. In an internal combustion engine, a power cylinder, a piston therein, a shaft, operative driving means between said piston and said shaft, a compressor cylinder disposed in axial alinement with said power cylinder, a piston therein driven by power derived from the piston in the power cylinder, and means for simultaneously increasing the volume of the compression space in the power cylinder and the capacity of the compressor cylinder.

16. In an internal combustion engine, a power cylinder, a piston therein, a shaft, operative driving means between said piston and said shaft, a compressor cylinder, a piston therein connected to and movable with the piston in the cylinder, and means for simultaneously varying the volume of the compression space in the power cylinder and the capacity of the compressor cylinder, while maintaining the strokes of said pistons constant.

17. In an internal combustion engine, a power cylinder, a piston therein, a shaft, operative driving means between said piston and said shaft, a compressor cylinder, a piston therein connected to and movable with the piston in the power cylinder, and means for simultaneously increasing the volume of the compression space in the power cylinder and the volume of the compressor cylinder.

18. In an internal combustion engine, a power cylinder, a piston therein, a shaft, operative driving means between said piston and said shaft, a compressor cylinder, a piston therein driven by power derived from the piston in the power cylinder, and means for simultaneously increasing the volume of the compression space in the power cylinder and increasing the effective stroke of the piston in the compressor cylinder, while maintaining the strokes of said pistons constant.

19. In an internal combustion engine, a power cylinder, a piston therein, a shaft, operative driving means between said piston and said shaft, a compressor cylinder disposed in axial alinement with said power cylinder, a piston therein connected to and movable with the piston in the power cylinder, and means for simultaneously varying the volume of the compression space in the power cylinder and increasing the effective stroke of the piston in the compressor cylinder.

20. In an internal combustion engine, a power cylinder, a piston therein, a shaft, operative driving means between said piston and said shaft, a compressor cylinder, a piston therein rigidly connected to and movable with the piston in the power cylinder, and means for simultaneously varying the volume of the compression space in the power cylinder and increasing the effective stroke of the piston in the compressor cylinder.

21. In an internal combustion engine, a power cylinder, a compressor cylinder, a piston in each of said cylinders, said pistons being rigidly connected, and means for varying the combustion space in the power cylinder without varying the stroke of the power piston and for simultaneously varying the effective stroke of the compressor piston.

22. In an internal combustion engine, a power cylinder, a compressor cylinder, a piston in each of said cylinders, said pistons being rigidly connected, and means for increasing the combustion space in the power cylinder without varying the stroke of the power piston and for simultaneously increasing the effective stroke of the compressor piston.

In witness whereof, I have hereunto set my hand this 9th day of September, 1930.

ANTHONY GEORGE MALDON MICHELL.